Sept. 30, 1952        G. RUSSELL        2,612,395

TAPERED LOCKING BUSHING MECHANISM

Filed Aug. 26, 1950

INVENTOR;
GLENN RUSSELL,
BY
ATTY.

Patented Sept. 30, 1952

2,612,395

UNITED STATES PATENT OFFICE 2,612,395

TAPERED LOCKING BUSHING MECHANISM

Glenn Russell, Worthington, Ohio, assignor to The Jeffrey Manufacturing Company, a corporation of Ohio Application August 26, 1950, Serial No. 181,646

4 Claims. (Cl. 287—52.06)

This invention relates to a locking mechanism for releasably mounting a pulley, sheave or the like on a shaft, and an object of the invention is to provide a simple, very efficient apparatus of the above mentioned type.

Other objects of the invention will appear hereinafter, the novel features and combinations being set forth in the appended claims.

Figure 1:
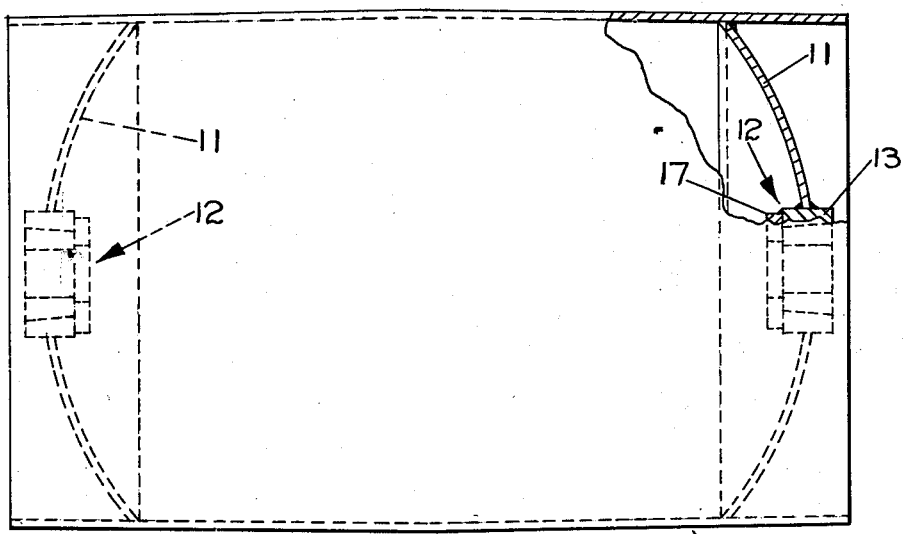
Fig. 1 is a plan view showing a pulley incorporating a pair of locking mechanisms involving my invention, with parts of the pulley broken away.

In Fig. 1 of the drawings there is illustrated a plain belt pulley 10 having opposite end bells 11, each of which is provided with an improved tapered locking bushing mechanism for rigidly and efficiently but releasably attaching the pulley to an axially extending center shaft, not shown. Devices of the general type here employed are known in the art, but I have provided a very simple, protected and efficient device for releasably attaching a pulley, sheave, or the like, to a shaft.

The attaching mechanisms are generally designated 12 and are of similar construction. Each includes a hub 13 rigidly attached to an end bell 11, as by welding, and provided with an axially extending tapered or frusto-conical bore 14 which progressively decreases in diameter inwardly. Fitting within the bore 14 of the hub 13 is a tapered or frusto-conical bushing or sleeve 15 which is split longitudinally at 16, thus providing for contraction and expansion of the diameter of the sleeve 15.

On its inner end the hub 13 is provided with a ring 17 which is welded to the hub 13 and extends radially inwardly from the adjacent edge thereof.

At diametrically opposite positions there is a pair of bores or screw holes 18, a portion of the walls of which are formed by the hub 13, and a portion by the bushing or sleeve 15. The screw holes 18 are plain or unthreaded and adapted to receive screws or bolts 19 which extend freely therethrough which means that they have no threaded engagement with either the bushing or sleeve 15 or the complementary portion of the screw hole formed in the hub 13.

The screws or bolts 19 are adapted to be received in threaded holes or bores 20 in the ring 17. Consequently by rotating the screws or bolts 19 they may be fed rectilinearly inwardly or outwardly relative to the hub 13 and the ring 17.

Figure 3:
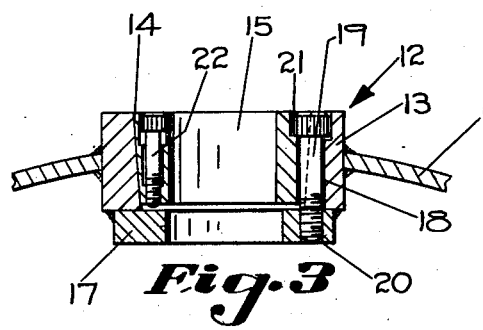
Fig. 3 is a sectional view taken along the line 3—3 of Fig. 2, looking in the direction of the arrows.
Figure 4:
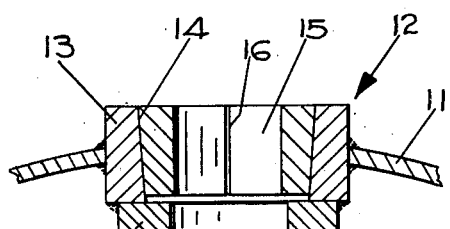
Fig. 4 is a sectional view taken along the line 4—4 of Fig. 2, looking in the direction of the arrows.

As clearly illustrated in Fig. 3 of the drawings, the bushing or sleeve 15 is provided with a ledge 21 cooperating with a head of each of the bolts 19 so that as said bolts 19 are fed inwardly their heads will abut the ledges 21 and thus force the wedging bushing 15 inwardly which due to the cooperation between its external wedging surface and the internal wedging surface of the hub 13 will cause said bushing or sleeve 15 to contract, whereupon its interior cylindrical surface may clamp against a receiving shaft, not shown.

It is, of course, necessary that the inner end of the sleeve 15 be spaced from the ring 17 at least until the final clamping action is effected. It is furthermore to be noted that the sleeve or bushing 15 is entirely or substantially entirely within the hub 13 when it is in its normal or shaft clamping position. Furthermore, the recesses provided in the hub 13 and the bushing 15, which receive the heads of the screws or bolts 19, result in an arrangement in which the bolts or screws 19 are also within the laterally outward confines of the hub 13.

As a consequence of this arrangement there are no projections axially beyond the outer faces of the hubs 13 when the apparatus is in its assembled and shaft clamping position. This makes for safety to a high degree.

Figure 2:
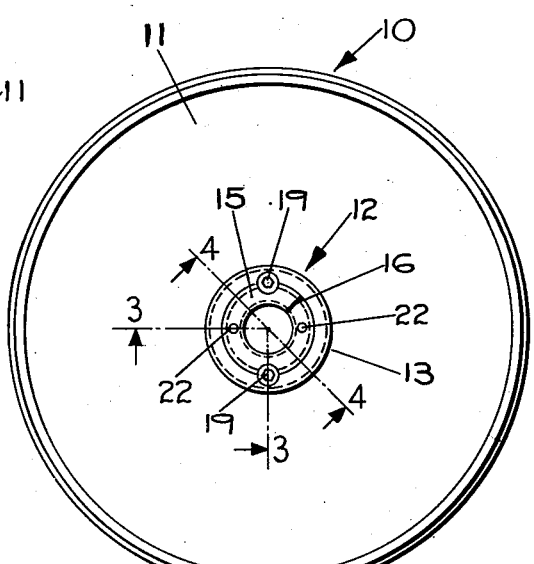
Fig. 2 is an end view of the pulley of Fig. 1, showing one of the locking mechanisms.

To remove the clamping or attaching mechanism 12 so as to free the pulley 10 from the shaft, not shown, it is only necessary to release or unscrew the two bolts or screws 19 and then screw down on a pair of removing screws 22 which are preferably diametrically spaced as illustrated in Fig. 2 of the drawings. The removing screws 22 are received in bores in the bushing or sleeve 15 to which they are threaded and they project through the inner edge thereof and abut the ring 17. As a consequence, upon their being screwed inwardly they obviously force the bushing or sleeve 15 outwardly. Under normal conditions the screws 22 will be substantially entirely within the axial confines of the hub 13. If desired, when the attaching or clamping units are assembled they may be screwed against the ring 17 sufficient to prevent their becoming loose in operation.

The attaching mechanism illustrated is very simple in operation and involves only the two relatively adjustable parts, namely, the hub 13 and the ring 17 which is an integral part thereof, on the one hand, and the bushing or sleeve 15, on the other hand, excepting, of course, the tightening and removing screws 19 and 22.

It is furthermore to be noted that since the bushing 15 is frusto-conical or tapered uniformly over its entire axial dimension it does not have a heavy flange or any other structure which prevents its ready contraction against the shaft, but said bushing is free to contract in its radial dimension under the camming influence of the cooperating tapered or frusto-conical surfaces provided by it and the hub 13, so as to effect an efficient clamping of the pulley 10 onto the shaft, not shown.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A shaft mountable unit comprising a hub having a tapered bore, a tapered split contractable bushing fitting within said bore and having an interior bore formed to clamp on a shaft, said hub and tapered bushing cooperating each to form in part screw holes extending parallel with the axis of said hub, threaded bolts extending freely through said holes formed by said hub and bushing, said hub having an extension axially spaced from said bushing whereby said bushing may move axially in said hub toward said extension to effect a progressive clamping action of said bushing, said extension forming threaded holes receiving said threaded bolts, said threaded bolts having heads, and ledges adjacent the portions of said bolt holes formed by said bushing adapted to be contacted by said heads while said threaded bolts are free to be fed axially relative to said hub.

2. A shaft mountable unit comprising a hub having a tapered bore, a tapered split contractable bushing fitting within said bore and having an interior bore formed to clamp on a shaft, said hub and tapered bushing cooperating each to form in part screw holes extending parallel with the axis of said hub, threaded bolts extending freely through said holes formed by said hub and bushing, a ring rigidly attached to said hub and axially spaced from said bushing whereby said bushing may move axially in said hub toward said ring to effect a progressive clamping action of said bushing, said ring forming threaded holes receiving said threaded bolts, said threaded bolts having heads, and ledges adjacent the portions of said bolt holes formed by said bushing adapted to be contacted by said heads while said threaded bolts are free to be fed axially relative to said hub.

3. A shaft mountable unit comprising a hub having a tapered bore, a tapered split contractable bushing fitting within said bore and having an interior bore formed to clamp on a shaft, said hub forming at least portions of screw holes extending parallel with the axis of said hub, threaded bolts extending freely through said holes, said hub having an extension axially spaced from said bushing whereby said bushing may move axially in said hub toward said extension to effect a progressive clamping action of said bushing, said extension forming threaded holes receiving said threaded bolts, said threaded bolts having heads, and ledges adjacent said bolt holes on said bushing adapted to be contacted by said heads while said threaded bolts are free to be fed axially relative to said hub.

4. A shaft mountable unit comprising a hub having a tapered bore, a tapered split contractable bushing fitting within said bore and having an interior bore formed to clamp on a shaft, said hub forming at least portions of screw holes extending parallel with the axis of said hub, threaded bolts extending freely through said holes, a ring rigidly attached to said hub and axially spaced from said bushing whereby said bushing may move axially in said hub toward said ring to effect a progressive clamping action of said bushing, said ring forming threaded holes receiving said threaded bolts, said threaded bolts having heads, and ledges adjacent said bolt holes on said bushing adapted to be contacted by said heads while said threaded bolts are free to be fed axially relative to said hub.

GLENN RUSSELL.

REFERENCES CITED

The following references are of record in the file of this patent:

UNITED STATES PATENTS

| Number | Name | Date |
| --- | --- | --- |
| 2,519,958 | Firth | Aug. 22, 1950 |
| 2,554,348 | Rudolph | May 22, 1951 |
| 2,557,405 | Armitage et al. | June 19, 1951 |